United States Patent [19]
Yamamoto et al.

[11] Patent Number: 4,521,236
[45] Date of Patent: Jun. 4, 1985

[54] METHOD FOR PREPARATION OF POROUS GLASS FILM

[75] Inventors: Minoru Yamamoto, Aichi; Jiro Sakata; Haruo Doi, both of Nagoya, all of Japan

[73] Assignee: Kabushiki Kaisha Toyota Chuo Kenkyusho, Aichi, Japan

[21] Appl. No.: 528,789

[22] Filed: Sep. 2, 1983

[30] Foreign Application Priority Data

Sep. 6, 1982 [JP] Japan .................. 57-154823

[51] Int. Cl.³ ............................ C03C 25/06
[52] U.S. Cl. ............................ 65/31; 65/2; 65/30.1; 55/523; 55/527; 156/643; 156/663
[58] Field of Search ............. 65/2, 30.1, 31; 156/643, 663; 55/523, 527

[56] References Cited

U.S. PATENT DOCUMENTS

| | | | |
|---|---|---|---|
| 3,785,793 | 1/1974 | Park .................................. | 65/31 |
| 3,825,466 | 7/1974 | Martin et al. ...................... | 156/643 X |
| 4,412,119 | 10/1983 | Komatsu et al. ................... | 156/643 X |
| 4,426,246 | 1/1984 | Kravitz et al. ..................... | 156/643 |

FOREIGN PATENT DOCUMENTS 166331  10/1982  Japan ...................... 65/31

*Primary Examiner*—Robert Lindsay
*Attorney, Agent, or Firm*—Parkhurst & Oliff

[57] ABSTRACT

There is provided a method for preparation of porous glass films, preferably in the form of a hollow filament, comprising heating glass films, formed from sodium borosilicate glass having a composition which can be phase-separated by heat-treatment into a soft phase easily eluted with a hot acid solution and a hard phase not easily eluted with the same solution, to separate the glass phase into the two phases and then subjecting the glass film to plasma etching in an atmosphere containing gaseous fluorine-containing compound(s) before or after acid elution of the soft phase. The thus obtained porous glass films have a uniform pore diameter and smooth surfaces and can be used as a variety of separating membranes.

9 Claims, 17 Drawing Figures

Fig.5A (x10.000)
Fig.5B
Fig.5C
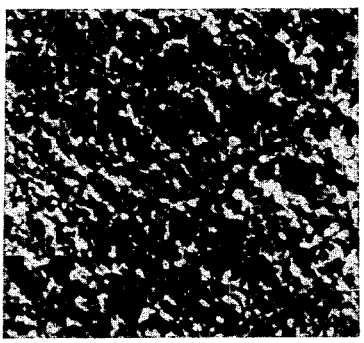
Fig.6A (x10.000)
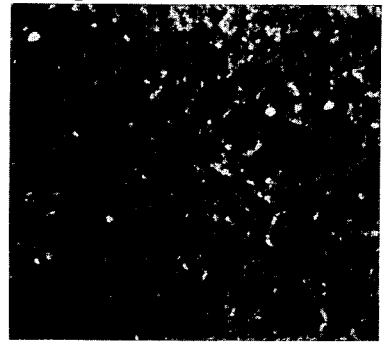
Fig.6B
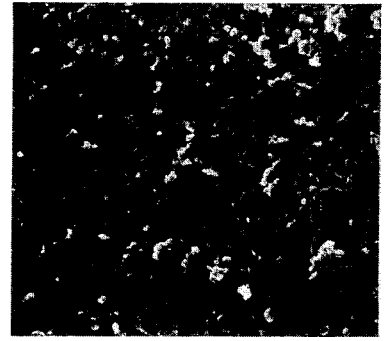
Fig.6C
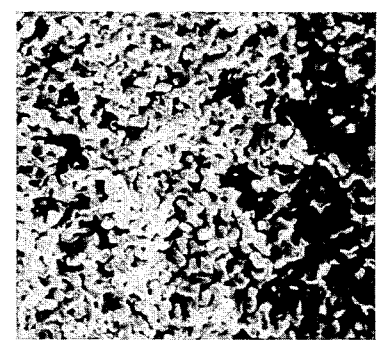

(x 10.000)

(x 10.000)

(x 10.000)

(×300)

(×10.000)

METHOD FOR PREPARATION OF POROUS GLASS FILM

BACKGROUND OF THE INVENTION

(1) Field of the Invention

This invention relates to a porous glass film, preferably in the form of a hollow filament, in which the pore size is controllable, and to a method for its preparation.

(2) Description of the Prior Art

In recent years, much research on porous membranes usable as ultrafiltration membranes and the like has been carried out. Since mainly high molecular weight materials are used for such porous membranes, those membranes have defects with respect to chemical resistance, mechanical strength, heat resistance and the like. Moreover, it has been very difficult to control the pore size of those membranes. Although Nuclepore (a trade name), which is made of a polycarbonate and developed by General Electric Co. in the U.S.A., is known as a porous membrane in which the pore size is controllable, it has the above-mentioned problems with respect to chemical resistance and the like because it consists of a high molecular weight material. Therefore, if a porous membrane having a desired pore diameter is prepared by the use of a ceramic material of excellent heat resistance and chemical resistance, very extensive applications can be expected for it.

Japanese Patent Publication No. 44580/1978 discloses a method for preparing porous glass in a hollow filamentous form by heat-treating sodium borosilicate glass spun into a hollow filament to separate the glass into a soft phase which is easy to elute with a hot acid solution and a hard phase which is difficult to elute with the solution, and then subjecting the glass filament to an acid extraction to make the glass porous. Furthermore, it discloses a method for increasing the pore diameter through sodium hydroxide-treatment. However, when such a porous glass filament is used as a porous membrane such as an ultrafiltration membrane or the like, sufficiently satisfactory results cannot be obtained with respect to permeability, uniformity of surface pores, control of pore size, smoothness of the surface and the like.

The present inventors have researched the preparation of porous glass in a hollow filamentous form and have found in the course of their research that the glass layers scarcely separated into the two phases were formed on the surfaces of the hollow filament during a spinning process or heat-treatment process for phase separation and that the layers became various barriers because they acted as a defense layer in acid extraction, caused a decrease in the permeability of the resulting porous glass and made control of the pore diameter on the surface difficult. The inventors further devoted themselves to the research and, as a result, have found that the above-mentioned layers not easily phase-separated could be removed by plasma etching in the presence of atomci fluorine. Thus, the inventors have accomplished a method for preparation of an improved porous glass film.

Incidentally, the term "porous glass film" used herein means a film such as membranes composed of porous glass having flat or curved structures, which is specifically exemplified by a hollow porous glass filament having a film-like wall.

SUMMARY OF THE INVENTION

An object of the present invention is to provide a method for preparation of a porous glass film, preferably in a hollow filamentous form having excellent chemical resistance, mechanical strength and heat resistance, smooth surfaces and a uniform pore diameter throughout from the inside to the surfaces thereof.

Another object of the present invention is to provide a method for preparation of a porous glass film, preferably in a hollow filamentous form, having a uniform predetermined pore diameter in the range of from several tens to several thousands Å by varying the process conditions.

A further object of the present invention is to provide a porous glass film, preferably in a hollow filamentous form, prepared by the above-mentioned method and usable as a separating membrane or the like.

Other objects of the present invention will become apparent from the appended drawings and the following description.

DETAILED DESCRIPTION OF THE INVENTION

Figure 1:
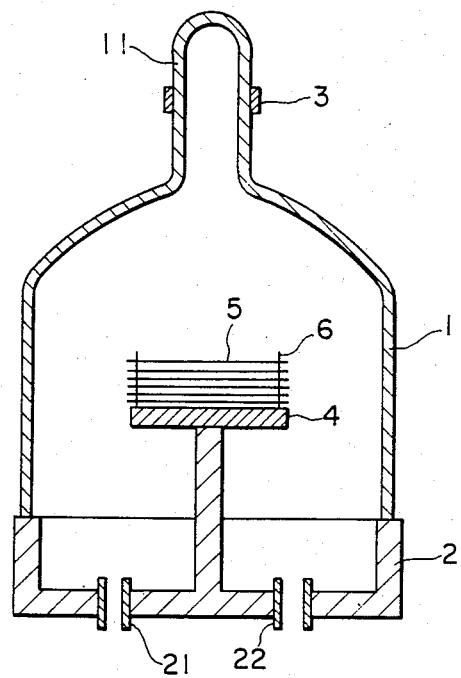
FIG. 1 is a longitudinal sectional view of a plasma generating apparatus usable for the plasma etching-treatment in the present invention.

The present invention is characterized in that a glass film, formed from sodium borosilicate glass having a composition which can be phase-separated by heat-treatment into a soft phase easily eluted with a hot acid solution and a hard phase not easily eluted with the same solution, is heated to separate the glass phase into the phases, and then is subjected to plasma etching in an atmosphere containing one or more gaseous fluorine-containing compounds before or after acid elution of the soft phase.

Any sodium borosilicate glass can be used in the present invention as long as the composition thereof enables phase-separation into the two phases through heat-treatment. However, sodium borosilicate glass usually comprises 60 to 80% by weight of $SiO_2$, 15 to 35% by weight of $B_2O_3$, and 3.5 to 12% by weight of $Na_2O$. A melt of the glass is drawn into a thin glass body (that is, a glass film), preferably in a hollow filamentous form.

The above-mentioned glass melt may contain additives such as aluminum oxide for improving its processability and other well known additives for improving its physical properties in the total amount of up to about 4% based on the total amount of the melt.

The above mentioned glass film usually has a thickness of about 1 μm to 5 mm, preferably a thickness of about 2 μm to 1 mm.

A hollow glass filament made from the above-mentioned sodium borosilicate glass may be prepared by a conventional spinning method, in which the melt of said glass is extruded through a nozzle and then cooled.

The hollow glass filament usually has a round cross section with an outer diameter of 10 μm to 10 mm, preferably 50 μm to 1 mm and a wall thickness of 1 μm to 2 mm, preferably 2 μm to 100 μm. The form of a hollow filament is desirable from the viewpoint of the applications thereof as a separating membrane and the like and of its durability against pressure applied thereto during use as a separating membrane.

The temperature and period of the heat-treatment for phase separation vary with the glass compositions employed, the size of the hollow-filament and the pore diameter desired for the filaments. Although the heat-treatment can be conducted at any temperature and period of time conventionally employed, it is usually effected at a temperature in the range of about 480° to 750° C., preferably 480° to 600° C., for a period of time in the range of about 0.25 to 300 hrs., preferably 3 to 200 hrs. "Phase separation as used herein means separation of the glass phase into a soft phase easily eluted with a hot acid solution and a hard phase difficult to elute with the same solution.

Any compound may be used as the fluorine-containing compound as long as it releases atomic or ionic fluorine when it is irradiated with high density energy beams or radiation as described hereinafter. Such compounds include $CF_4$, $C_2F_6$, HF and $SF_6$, or mixtures thereof. $CF_4$ is preferred.

The gas of such compounds can be used alone or may be diluted with oxygen or an inert gas such as argon or nitrogen, preferably with oxygen, to be used as a gas mixture. Although a gas mixture containing 2 to 3% by volume of ghe gaseous fluorine-containing compound based on the total volume of the gas mixture may be used for the plasma etching, the higher the mixing ratio of the gaseous fluorine-containing compound is, the better the etching efficiency will become. A content of the gaseous fluorine-containing compound of at least 10% by volume in the gas mixture is practically preferred. A sole $CF_4$ gas or a gas mixture of $CF_4$ and oxygen, preferably containing at least 80% by volume of $CF_4$, is particularly preferable.

The plasma etching-treatment used herein means a treatment to corrode and remove the surface layers of a glass film with atomic or ionic fluorine generated through irradiation of the gaseous fluorine-containing compound(s) with high density energy beams or irradiation. The value of the high density energy used in the present invention depends upon the type of the fluorine-containing compound used.

As a high density energy source can be used a high frequency generator (e.g. 1–100 KHz; 13.56 MHz; 2,450 MHz); a D.C. power source; for a commercial power source.

The period of time for the plasma etching varies extensively with the etching conditions (such as the shape and input of a plasma-etching apparatus and the pressure and atmosphere in the apparatus) but is usually 1 to 30 min., preferably 3 to 10 min. Layers on the glass surface which are not easily phase-separated can be removed by the plasma etching-treatment.

Elution of the soft phase with a hot acid solution may be carried out either before or after the plasma etching-treatment. However, elution after the plasma etching-treatment can remove the surface layers of a glass film more effectively. As the hot acid solution can be used a mineral acid or an organic acid such as hydrochloric acid, sulfuric acid, nitric acid or acetic acid, preferably hydrochloric acid or sulfuric acid, usually 0.5 to 5N and usually at a temperature of 60° to 100° C., preferably at 90° to 100° C. It is to be noted that the acid eluting solution should have a uniform temperature distribution. The acid elution is followed by sufficient washing with water.

Thus, porous glass film having smooth surfaces and a uniform pore diameter throughout from the surfaces to the inside of the film is obtained. In the present invention, it is also possible to control the pore diameter distribution within a narrow range of ± several percent and further it is possible to control the pore diameter to a desired value by adjusting the glass composition and the temperature and period of the heat-treatment. In general, the higher the heat-treatment temperature, the longer the heat-treatment time, or the higher the content of components $B_2O_3$ and $Na_2O$ in the glass composition, the larger the pore diameter will become. For example, in order to adjust the pore diameter to about several tens of Å, a glass film having a composition of 65% by weight of $SiO_2$, 30% by weight of $B_2O_3$ and 5% by weight of $Na_2O$ is heat-treated at 500° C. for 24 hours. On the other hand, for adjusting the pore diameter to about several thousand Å, a glass film having a composition of 62.5% by weight of $SiO_2$, 32.7% by weight of $B_2O_3$ and 4.8% by weight of $Na_2O$ is heat-treated at 500° C. for 200 hours.

The porous glass film thus obtained may be subjected to another treatment process to change the pore size. For example, as described in Japanese Patent Publication No. 44580/1978, the pore may be enlarged by partially eluting the silicon dioxide structure with a strong alkaline solution such as NaOH solution. In this process, a porous body can be provided having an unsymmetrical pore distribution by contacting the solvent only with one side of the glass film. On the other hand, when an additional heat-treatment at about 700° to 800° C. is applied to the porous glass film, the pore diameter may be reduced and the porous glass film will become compact. Further, application of such additional heat-treatment only to one side of the porous glass film can provide unsymmetrical pore distribution.

Figure 2:
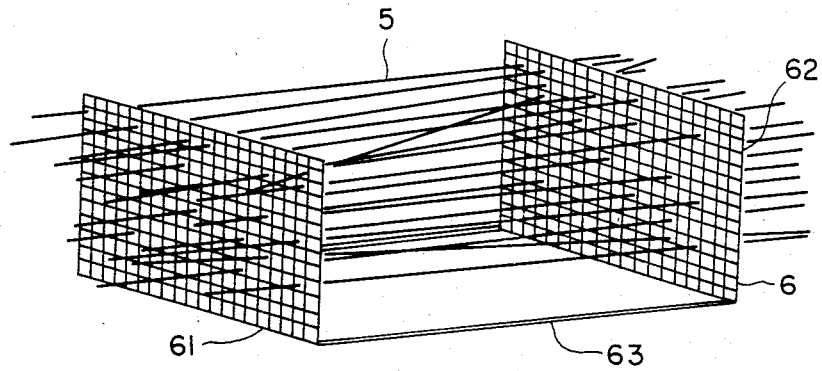
FIG. 2 is a schematic perspective view of a supporting frame for hollow glass filaments.

A specific example of a plasma generating apparatus usable for the plasma etching-treatment in the present invention is described with reference to the attached FIGS. 1 and 2. The plasma generating apparatus shown in FIG. 1 comprises a glass jar 1 having a protrusion 11 on its top, a metal stand 2 constituting the bottom of jar 1 and a copper electrode 3 wound around the protrusion 11. The stand 2 is provided with an inlet 21 for introducing an etching gas (i.e. a gas or a gas mixture used for the plasma-etching) and an outlet 22 for evacuating gas from the jar 1. A sample stand 4 made of metal is installed inside the jar 1. Hollow filamentous glass to be subjected to the plasma etching-treatment is, for example, irregularly attached to a supporting frame 6 having two opposite metal nets 61 and 62 secured together with wires 63, in such a way as to support the glass filament in meshes of the metal nets as shown in FIG. 2. The supporting frame 6 is then placed on the sample stand 4. Hollow glass filaments 5 are inserted irregularly in the supporting frame 6 because too dense of an arrangement of the glass filaments 5 in the frame 6 will result in nonuniform removal of surface layers of the glass filaments. Clearly, the arrangement of the glass filaments 5 need not be restricted to the manner shown; for example, fixing one end of a bundle of glass filaments and opening the other end of the bundle to avoid too dense attachment of the filaments is also acceptable.

It is of course also possible to change the supporting frame to another form.

The present invention is described in more detail by way of the examples and comparative examples given below. "Parts" hereinafter means "parts by weight" unless otherwise specified.

EXAMPLE 1

Raw materials $SiO_2$, $B_2O_3$ and $Na_2O$ were melted to provide a uniform melt and then cooled and ground. The resulting glass material (having a composition of 65.0 parts of $SiO_2$, 28.0 parts of $B_2O_3$ and 7.0 parts of $Na_2O$) was placed in a quartz crucible, and heated to about 1100° C. The molten glass was spun into hollow filaments at a spinning rate of 20 to 75 m/min. while blowing air into a nozzle at a pressure slightly higher than atmospheric pressure. The resultant hollow glass filament was wound around a drum 30 cm in diameter. The thus-spun hollow glass filament had an outer diameter of about 200 $\mu$m and a wall-thickness of about 15 $\mu$m. The filament was cut to a length of about 20 cm. About 100 pieces of the filaments were placed in a quartz tube having an outer diameter of 8 mm, an inner diameter of 7 mm and a length of 30 cm. Subsequently, the quartz tube was placed in an electric furnace and the temperature in the tube was raised from room temperature to 550° C. in about 3 hours and retained at 550° C. for 120 hours to effect phase-separation. The hollow glass filaments thus phase-separated were cooled to room temperature and then taken out of the quartz tube.

Next, the resulting hollow glass filaments 5 were irregularly inserted in the supporting frame 6 having two opposite metal nets 61 and 62 with a mesh of 0.5 mm as shown in FIG. 2. The supporting frame 6 fitted with the hollow glass filaments 5 was placed on a metal sample stand 4 disposed in the glass jar 1 having a height of about 50 cm and a bottom part diameter of about 30 cm in a plasma generating apparatus 1 shown in FIG. 1. Then air in the jar 1 was evacuated through the outlet 22 by means of a vacuum pump (not shown in the figure). $CF_4$ gas was introduced into the jar 1 through the inlet 21 by means of the vacuum pump to continue evacuation and thus the pressure in the jar 1 was maintained at 0.23 Torr. At this state, the stand 2 was grounded and high frequency voltage of about 1 KV and of 13.56 MHz was applied to the electrode 3 to conduct plasma etching-treatment for 5 min. Thus, the surface layers of the hollow glass filaments 5 were removed.

Figure 3A:
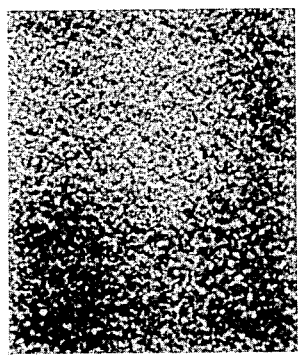
FIGS. 3A and B, 4A and B, 5A–C, 6A–C, 7, 8, 9 and 10A and 10B are SEM texture pictures of the surfaces and/or surface cross sections of hollow glass filaments obtained in Examples 1 and 5–12 and Comparative Examples 1–4, respectively.
Figure 3B:
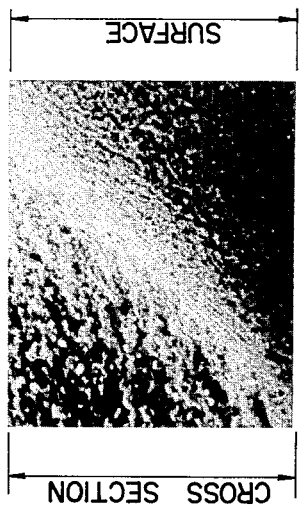

The glass filaments 5 were placed in 100 ml of 1N sulfuric acid solution heated to 98° C. and retained at that temperature for 4 hours to elute the soft phase of the glass with the acid. The hollow filaments were taken out of the acid solution, washed in flowing water for 10 hours and then air-dried. Thus, hollow porous glass filaments were obtained. Scanning electron microscope (abbreviated as SEM hereinafter)-observation of the surface and of a range from the surface to the cross section (described as surface/cross section hereinafter) of the hollow porous glass filament was carried out. The SEM textures (of 10,000 magnification) of the surface and the surface/cross section of the glass filament are shown in FIGS. 3A and 3B, respectively.

EXAMPLES 2 and 3

Phase separation-treated hollow glass filaments obtained in Example 1 were treated in the same manner as in Example 1 except that the plasma etching-treatment was effected for 10 min. (in Example 2) or for 3 min. (in Example 3).

EXAMPLE 4

Phase separation-treated hollow glass filaments obtained in Example 1 were treated in the same manner as in Example 1 except for using a gas mixture of $CF_4$ and $O_2$ (consisting of 90% by volume of $CF_4$ and 10% by volume of $O_2$) in place of a sole $CF_4$ gas as the etching gas.

EXAMPLE 5

Phase separation-treated hollow glass filaments obtained in Example 1 were subjected to an acid elution with an aqueous 1N sulfuric acid solution at 98° C. for 4 hours and were then washed in flowing water. After that, the glass filaments were plasma-etched under the same conditions as in Example 1.

Figure 4A:
Figure 4B:

SEM textures (of 10,000 magnification) of the surface and the surface/cross section of the resulting hollow porous glass filament are shown in FIGS. 4A and 4B, respectively.

EXAMPLES 6-8

A hollow porous glass filament was prepared in the same manner as in Example 1 except for using a glass melt having a composition of 65 parts of $SiO_2$, 30 parts of $B_2O_3$ and 5.0 parts of $Na_2O$ and effecting the heat-treatment of the glass filament at 500° C. for 24, 72 or 200 hours (corresponding to EXamples 6, 7 and 8, respectively). SEM textures of the surfaces of the resulting porous glass filaments are shown in FIGS. 5A (Example 6), 5B (Example 7) and 5C (Example 8). FIGS. 5A, 5B and 5C show that the pore diameter becomes larger as the heat-treatment time is increased.

EXAMPLES 9-11

A hollow porous glass filament was prepared in the same manner as in Examples 6, 7 and 8 (corresponding to Examples 9, 10 and 11, respectively) except for using a glass melt having a composition of 62.5 parts of $SiO_2$, 32.7 parts of $B_2O_3$ and 4.8 parts of $Na_2O$. SEM textures of the cross sections of the porous glass filaments prepared in Examples 9, 10 and 11 are shown in FIGS. 6A, 6B and 6C, respectively. These figures show that the pore diameter becomes larger as the heat-treatment time is increased, just as in Examples 6 through 8. Further, it is confirmed from these figures that a slight alteration of glass composition results in a change of the pore diameter of the porous glass.

EXAMPLE 12

A hollow porous glass filament was prepared in the same manner as in Examples 9 through 11 except for heat-treating the glass filament at 590° C. for 3 hours. SEM texture of the cross section of the glass filament is shown in FIG. 7.

Figure 7:

It is ascertained from FIG. 7 that the pore diameter has largely grown in a very short period of heat-treatment time in this example as compared with Examples 9 through 11. Thus it can be seen that the growing rate of the pore diameters is increased by raising the temperature of the heat-treatment.

EXAMPLE 13

A hollow porous glass filament was prepared in the same manner as in Examples 9 through 11 except for using a glass melt having a composition of 71.4 parts of SiO$_2$, 23.8 parts of B$_2$O$_3$ and 4.8 parts of Na$_2$O and heat-treating the glass filament at 650° C. for 2 hours. SEM texture of the cross section of the resulting porous glass filament showed that the pore diameter was of the order of 100 Å.

Glass compositions and heat-treatment conditions in the above-mentioned Examples 6 through 13 are summarized in Table 1 below.

TABLE 1

| Example No. | Glass composition (parts by weight) | | Heat-treatment conditions | |
|---|---|---|---|---|
| | | | Temp. (°C.) | Time (hours) |
| 6 | SiO$_2$ | 65 | 500 | 24 |
| 7 | B$_2$O$_3$ | 30 | 500 | 72 |
| 8 | Na$_2$O | 5 | 500 | 200 |
| 9 | SiO$_2$ | 62.5 | 500 | 24 |
| 10 | B$_2$O$_3$ | 32.7 | 500 | 72 |
| 11 | Na$_2$O | 4.8 | 500 | 200 |
| 12 | | | 590 | 3 |
| 13 | SiO$_2$ | 71.4 | 650 | 2 |
| | B$_2$O$_3$ | 23.8 | | |
| | Na$_2$O | 4.8 | | |

COMPARATIVE EXAMPLE 1

Figure 8:
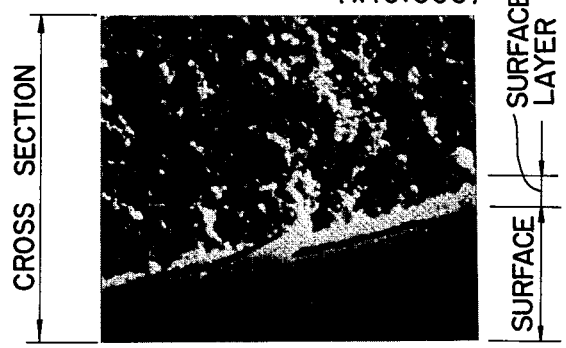

A hollow porous glass filament was prepared in the same manner as in Example 1 except that plasma etching-treatment was omitted. SEM texture of the surface/cross section of the resulting porous glass filament is shown in FIG. 8. It is confirmed from FIG. 8 that a layer having few pores is present on the surface of the glass filament obtained in this comparative example wherein plasma etching-treatment was omitted.

COMPARATIVE EXAMPLE 2

A hollow porous glass filament was prepared in the same manner as in Example 5 except that etching-treatment of the glass filament was effected by dipping it in an aqueous 0.5N sodium hydroxide solution at 45° C. instead of plasma etching-treatment for 10 minutes. SEM texture of the surface of the resulting porous glass filament is shown in FIG. 9.

Figure 9:
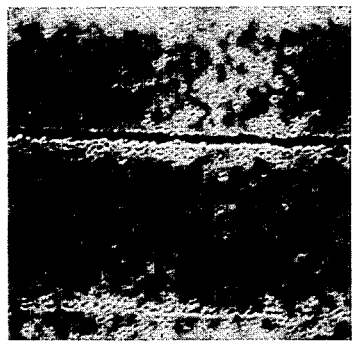

FIG. 9 shows that in this comparative example the pores in the glass filament are few and are not uniformly distributed, and that the surface of the filament is not smooth because grooves are formed thereon. When the above-mentioned etching condition was altered only by lowering the temperature of the NaOH solution to 30° C. with an etching time of 10 min., no pores were observed in the SEM texture observation of the resultant glass filament. However, alteration of the above-mentioned etching condition only by extending the etching time to 20 min. resulted in substantial embrittlement of the glass filament.

The gas permeability characteristics of the porous glass filaments obtained in Examples 1 through 5 and Comparative Examples 1 and 2 were determined. The results thereof are shown in Table 2.

TABLE 2

| | Plasma etching time (min.) | Oxygen gas permeability (cm$^3$/cm$^2$ · sec · cmHg) | Others |
|---|---|---|---|
| Example 1 | 5 | 1.5 × 10$^{-3}$ | CF$_4$ gas is used as an etching gas |
| Example 2 | 10 | 1.8 × 10$^{-3}$ | CF$_4$ gas is used as an etching gas |
| Example 3 | 3 | 1.5 × 10$^{-3}$ | CF$_4$ gas is used as an etching gas |
| Example 4 | 5 | 1.7 × 10$^{-3}$ | 90% CF$_4$ + 10% O$_2$ |

TABLE 2-continued

| | Plasma etching time (min.) | Oxygen gas permeability (cm$^3$/cm$^2$ · sec · cmHg) | Others |
|---|---|---|---|
| Example 5 | 5 | 1.5 × 10$^{-3}$ | mixture is used as an etching gas Plasma etching is effected after elution of the soft phase |
| Comparative Example 1 | — | Not more than 1 × 10$^{-6}$ | No plasma etching |
| Comparative Example 2 | — | 4.0 × 10$^{-3}$ | Etching with 0.5 N NaOH solution |

COMPARATIVE EXAMPLES 3 AND 4

Figure 10A:
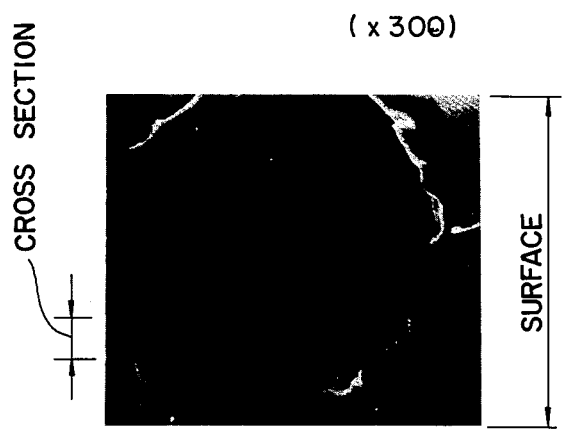
Figure 10B:
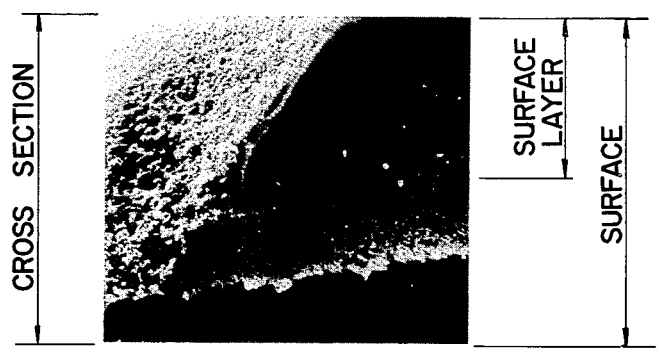

A hollow porous glass filament was prepared in the same manner as in Example 1 except that etching of the glass was conducted by using an aqueous hydrofluoric acid solution instead of a plasma etching-treatment. The etching was effected by using an aqueous 20% HF solution at 25° C. for 10 sec. in Comparative Example 3 and by using an aqueous 1% HF solution at 25° C. for 15 min. in Comparative Example 4. SEM textures of the surface/cross section of the porous glass filaments obtained in Comparative Examples 3 and 4 are shown in FIGS. 10A (×300) and 10B (×10,000), respectively. It can be seen from FIGS. 10A and B that etching is not uniformly effected in Comparative Examples 3 and 4.

From the above Comparative Examples 2 through 4, it is ascertained that uniform etching only of the surface layers cannot be achieved by a wet etching method because etching inside of the hollow glass filament proceeds at the same time in that method. In contrast, the plasma etching treatment according to the present invention, which is a dry etching, enables uniform etching only of the surface layer and thus is an excellent treatment from the viewpoint of ensuring uniformity of pores.

EXAMPLES 14 AND 15

On each surface of the porous glass filaments obtained in Examples 1 and 5, a plasma-polymerized film was formed by using hexamefhyldisiloxane as a monomer gas in accordance with the plasma polymerization method disclosed in Japanese Laid-Open Patent Publication No. 58518/1981 to obtain a composite membrane.

COMPARATIVE EXAMPLE 5

A composite membrane was prepared in the same manner as in Examples 14 and 15 except for using a porous glass filament obtained in Comparative Example 1.

COMPARATIVE EXAMPLE 6

A composite membrane was prepared in the same manner as in Examples 14 and 15 except for using a hollow polypropylene filament (manufactured by Mitsubishi Rayon Co.) instead of a hollow porous glass filament.

Gas permeability characteristics of the composite membranes obtained in Examples 14 and 15 and in Comparative Examples 5 and 6 were determined. The results are shown in Table 3.

TABLE 3

| Example No. | Plasma polymerization time (min.) | Oxygen gas permeability: $PO_2$ ($cm^3/cm^2 \cdot sec \cdot cm\ Hg$) | Separation ratio $PO_2/PN_2$ |
| --- | --- | --- | --- |
| Example 14 | 10 | $2.5 \times 10^{-4}$ | 2.2 |
| Example 15 | 10 | $1.8 \times 10^{-4}$ | 2.6 |
| Comparative Example 5 | 10 | not more than $1 \times 10^{-6}$ | — |
| Comparative Example 6 | 10 | $4.9 \times 10^{-5}$ | 2.5 |

From the results shown in Table 3, it is ascertained that the composite membranes obtained in Examples 14 and 15 have a large oxygen gas permeability as compared with those in Comparative Examples 5 and 6 and are excellent as a porous substrate for a composite membrane.

From the above Examples and Comparative Examples, it has been confirmed that the plasma etching treatment according to the present invention results in uniform etching and can provide porous glass film having pores of uniform size throughout from the inside of the film to the surface thereof and also having smooth surfaces as compared with those obtained through conventional wet etching methods. Furthermore, according to the present invention, the pore diameter can be adjusted to a desired value by changing the glass composition and controlling the temperature and time of heat-treatment of the glass.

Therefore, a porous glass film, especially in hollow filamentous form, prepared according to the present invention can be used for such applications in which uniformity of the pores on the surface and control of the pore diameter are important, such as in various separating membranes, in particular, an ultrafiltration membrane. Further, it is also possible to produce a composite membrane for separating gases by applying plasma polymerization-treatments disclosed in U.S. patent application No. 388,577 filed June 15, 1982 now U.S. Pat. No. 4,410,338 granted Oct. 18, 1983 (as a continuation of U.S. patent application No. 159,275 filed June 13, 1980 now abandoned) to the porous glass film prepared according to the present invention.

What is claimed is:

1. A method for preparing a porous glass film comprising:

forming a glass film from sodium borosilicate glass having a composition which can be phase-separated by heat-treatment into a soft phase easily elutable with a hot acid solution and a hard phase not easily elutable with the same solution;

heating said glass film to separate the glass phase into said soft and hard phases;

removing said soft phase from said glass film by eluting the same with said hot acid solution; and subjecting said glass film to plasma etching in an atmosphere containing at least one gaseous fluorine-containing compound before or after said acid elution of the soft phase to remove the surface layers of said glass film, thereby providing a porous glass film having smooth surfaces and a uniform pore diameter throughout from the surfaces to the inside of said glass film.

2. The method as set forth in claim 1, wherein the glass film is in a hollow filamentous form.

3. The method as set forth in claim 1, wherein the plasma etching is carried out before the acid elution of the soft phase.

4. The method as set forth in claim 1, wherein said gaseous fluorine-containing compound is selected from the group consisting of $CF_4$, $C_2F_6$, HF and $SF_6$.

5. The method as set forth in claim 4, wherein said fluorine-containing compound is $CF_4$.

6. The method as set forth in claim 1, wherein said atmosphere consists of a gaseous mixture of $CF_4$ and $O_2$.

7. The method as set forth in claim 1, wherein said atmosphere consists of a gaseous mixture of said gaseous fluorine-containing compound and an inert gas.

8. The method as set forth in claim 1, wherein pore diameter of the porous glass film is controlled by adjusting the composition of the sodium borosilicate glass, the temperature of the heat-treatment and/or the time period of the heat-treatment.

9. The method as set forth in claim 8, wherein the pore diameter of the porous glass film is adjusted to a predetermined pore diameter in the range from several tens of Å to several thousand Å by using sodium borosilicate glass consisting essentially of 60 to 80 parts by weight of $SiO_2$, 15 to 35 parts by weight of $B_2O_3$ and 3.5 to 12 parts by weight of $Na_2O$ and effecting the heat-treatment at a temperature in the range of 480°–750° C. for a period of time in the range of 0.25°–300 hours.

* * * * *